UNITED STATES PATENT OFFICE.

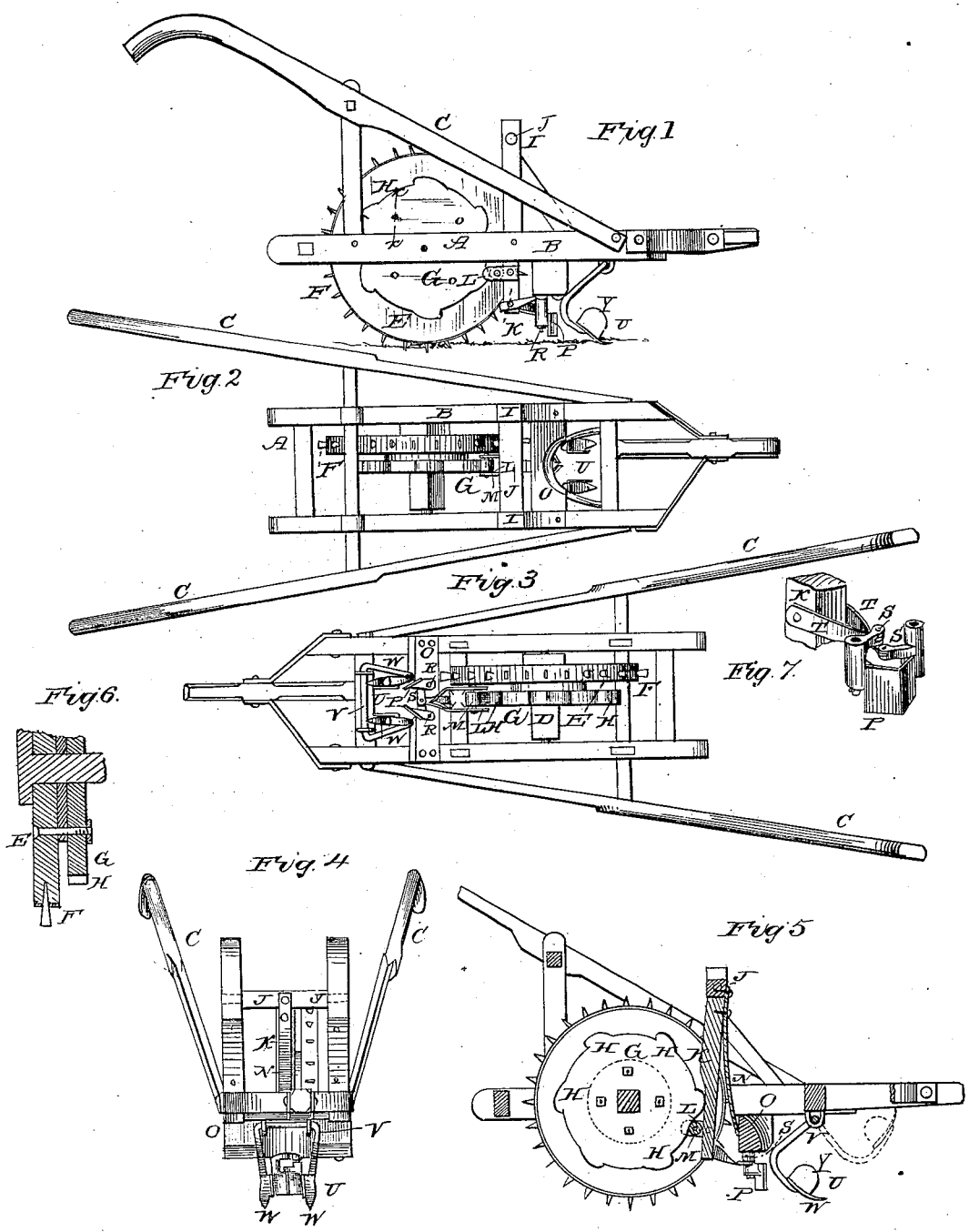

LUTHER B. OWEN, OF MARIETTA, GEORGIA, ASSIGNOR TO CORNELIA E. OWEN, OF SAME PLACE.

CULTIVATOR.

SPECIFICATION forming part of Letters Patent No. 265,278, dated October 3, 1882.

Application filed May 23, 1882. (Model.)

*To all whom it may concern:*

Be it known that I, LUTHER B. OWEN, of Marietta, in the county of Cobb and State of Georgia, have invented certain new and useful Improvements in Cultivators; and I do hereby declare that the following is a full, clear, and exact description of the invention, which will enable others skilled in the art to which it appertains to make and use the same, reference being had to the accompanying drawings, which form a part of this specification.

This invention relates to combined cotton-choppers and cultivators, and has for its object to provide a simple, durable, inexpensive, and efficient machine. To this end it consists in certain improvements in the construction and operation of the same.

In the drawings, Figure 1 is a side view; Fig. 2, a top view; Fig. 3, a bottom view; Fig. 4, a front end view; Fig. 5, a vertical longitudinal sectional view; Fig. 6, a section on the line $x\,x$, Fig. 1; and Fig. 7, a detail view of the hoes or choppers.

Referring by letter to the drawings, A designates the frame of the machine, which may be of any suitable construction, and comprises two longitudinal beams, B B, to which are fixed the handles C C.

D is a transverse shaft or axle, journaled between the beams B B, on which is fixed the main drive-wheel E, the periphery or rim of which is preferably provided with teeth F. Arranged on shaft D is another wheel or disk, G, adapted to be bolted to wheel E, and provided at suitable distances apart on its periphery with cams or projections H, as shown.

I I are two uprights or standards on beams B B, in front of wheel G, between which standards is journaled a rock-shaft, J, carrying a downwardly-extending arm, K, provided with a suitable rearwardly-extending bracket, L, in which is journaled a roller or wheel, M, which is engaged by the projections H to intermittently force arm K forward, a flat spring, N, on the latter being arranged to bear on a cross-piece, O, on beams B B, to return arm K to its normal position.

P P are the chopping-blades, the shanks or tangs Q of which are journaled on spindles or pins R, projecting from the cross-piece O, and provided with inwardly-extending arms S, to each of which is pivoted a connecting-rod, T, pivoted at its rear end to the lower end of arm K. Thus the blades, which normally come together in V position, are alternately forced apart and brought together by the movement of arm K to form the hills.

In front of the hoes are arranged the plows U U, the shanks of which are preferably formed of a continuous suitably-bent rod, V, having the blades W W secured to its ends and hinged at the top to a cross-piece, X. The blades W W are provided with plates Y Y, forming fenders to keep dust and dirt from off the young plants. Thus the plows may be thrown up on their hinges out of play, when desired. While in operation the bent rod bears on the cross-piece O.

The operation and advantages of my invention will be readily understood. It provides a most efficient and convenient cotton-chopper, and when desired for use as a cultivator the hoes can be readily removed and the wheel or disk G unbolted from the drive-wheel and removed from engagement with the chopper-operating arm.

I claim and desire to secure by Letters Patent—

1. The combination, with the frame having a cross-piece, O, standards I I, and carrying a rotary shaft on which is fixed the drive-wheel, and a wheel or disk, G, having cams or projections H, of a rock-shaft journaled between standards I I, having an arm, K, engaged by cogs H, and suitable spring mechanism, N, and the chopping-blades journaled on spindles or pins on piece O, and connected to the lower end of arm K by rods T, as set forth.

2. The combination, with a cross-piece, O, on the frame, having projecting spindles or pins R R, of chopping-blades, the shanks or tangs of which are journaled on said spindles, and provided with inwardly-extending arms S, to which is pivoted a connecting-rod, T, also pivoted at its rear end to the vibratory arm of a rock-shaft, as set forth.

3. The combination, with the frame having a cross-piece, O, carrying the hoes or choppers, and a cross-piece, X, in front of the same, of the plows on the ends of one U-shaped standard, hinged to the latter, so as to be thrown up out of engagement, and when in use adapted to bear against cross-piece O, as set forth.

In testimony that I claim the foregoing as my own I have hereto affixed my signature in presence of two witnesses.

LUTHER B. OWEN.

Witnesses:
J. R. LITTELL,
GEO. F. GRAHAM.